United States Patent [19]

Slaven

[11] Patent Number: 5,786,394
[45] Date of Patent: Jul. 28, 1998

[54] DURABLE, ENERGY-ABSORPTIVE EPP/PUR STRUCTURAL COMPOSITES

[75] Inventor: John P. Slaven, Harper Woods, Mich.

[73] Assignee: Lear Corporation, Southfield, Mich.

[21] Appl. No.: 760,290

[22] Filed: Dec. 4, 1996

[51] Int. Cl.$^6$ ............................................. C08J 9/34
[52] U.S. Cl. .................. 521/51; 264/45.1; 264/45.8; 428/304.4; 428/308.4; 428/316.6; 428/423.1; 428/424.2; 428/424.8; 428/500; 428/521; 428/523; 521/155
[58] Field of Search ................ 521/51, 155; 264/45.1, 264/45.8; 428/424.2, 423.1, 424.8, 500, 521, 523, 304.4, 308.4, 316.6

[56] References Cited

U.S. PATENT DOCUMENTS

| | | |
|---|---|---|
| 3,819,784 | 6/1974 | Hasama et al. . |
| 3,833,259 | 9/1974 | Pershing . |
| 3,840,627 | 10/1974 | Rhodes, Jr. . |
| 3,929,948 | 12/1975 | Welch et al. . |
| 3,954,537 | 5/1976 | Alfter et al. . |
| 3,991,146 | 11/1976 | Barrie . |
| 4,039,363 | 8/1977 | Robertson . |
| 4,040,670 | 8/1977 | Williams . |
| 4,190,697 | 2/1980 | Ahrens . |
| 4,228,600 | 10/1980 | Krug et al. . |
| 4,405,681 | 9/1983 | McEvoy . |
| 4,436,276 | 3/1984 | Donahue . |
| 4,660,830 | 4/1987 | Tomar . |
| 4,714,574 | 12/1987 | Tenhagen . |
| 5,075,162 | 12/1991 | Okubo et al. . |
| 5,114,980 | 5/1992 | Lii et al. . |
| 5,166,183 | 11/1992 | Franyutti et al. . |
| 5,176,860 | 1/1993 | Storch . |
| 5,266,234 | 11/1993 | Ho et al. . |
| 5,273,695 | 12/1993 | Brown et al. . |
| 5,275,860 | 1/1994 | D'Luzansky et al. . |
| 5,338,820 | 8/1994 | Harrison et al. . |
| 5,374,383 | 12/1994 | Brambach . |
| 5,389,693 | 2/1995 | DeGenova et al. . |

*Primary Examiner*—John M. Cooney, Jr.
*Attorney, Agent, or Firm*—Brooks & Kushman

[57] ABSTRACT

Structural composite parts having a light-weight expanded polyolefin core are rendered resistant to breakage under bending stress by molding an integral skin polyurethane flexible foam around the core. The resulting composite parts have excellent compressive strength and energy absorption properties while being resistant to breakage, and are well suited for light-weight and cost effective energy management structures in vehicle interiors.

14 Claims, 2 Drawing Sheets

DURABLE, ENERGY-ABSORPTIVE EPP/PUR STRUCTURAL COMPOSITES

TECHNICAL FIELD

The present invention relates to energy-absorptive materials useful in the design and construction of vehicle interiors and the like. More particularly, the present invention pertains to an energy-absorptive expanded polyolefin (EPO) /integral skin flexible polyurethane foam (PUR) structural composite which is durable, and capable of providing structural support.

BACKGROUND ART

Over the last 25 years or so, energy absorption management has become an increasingly important part of the design and construction of modern transportation vehicles. Early on, it was recognized that vehicles designed with deformable front and/or rear structures provided greater safety to vehicle occupants in the case of a crash, due to the impact energy absorption by the structure as it deforms. It has become increasingly common to design vehicles, particularly automobiles, in this manner. However, while deformable structures such as these are helpful in preventing or minimizing injuries to passengers, as a result of the severe structural damage done to the vehicle, repair and reconstruction of the vehicle is an expensive and time-consuming practice. Repair procedures are especially viewed as unnecessary when the impact involves low to moderate energy, which might be encountered in bumper-to-bumper contact in a parking lot, for example. To mitigate against damage caused by such relatively energy deficient impacts, it has become common to mount automobile bumpers by resilient but energy absorptive mounts, or to prepare the bumpers themselves out of energy-absorptive material. For example, expanded polypropylene (EPP) within a glass fiber reinforced exterior shell has been used for such purposes, the EPP providing for excellent energy absorption coupled with resilience enabling the bumper to spring back to its pre-impact shape, and the glass fiber reinforced shell providing sufficient structural strength for the bumper to serve as a structural as well as energy-absorptive component.

Concerns with vehicular impacts have extended to the passenger compartment as well, and over the past few decades, the plethora of angular objects extending into the passenger compartment such as window cranks, door handles, door lock buttons, and the like, have decreased, have been recessed so as to no longer protrude, or been eliminated entirely. Moreover, many of the car interior materials such as those found in dashboards, side bolsters, pillars, and even seats and headrests, have been selected with impact energy absorption in mind. For example, side bolsters of rigid polyurethane have been proposed as a means for absorbing impact energy which might result when the occupant of a vehicle comes in contact with a side bolster or other component during a car crash. However, rigid polyurethanes tend to deform permanently, and thus must be replaced after a severe impact unless a cosmetically defective component which will display a decreased energy-absorptive capacity in the case of a future impact can be tolerated.

While expanded polyolefin had been utilized for some automotive parts, for example bumpers requiring impact resistance, it has not met with widespread use in car interiors, even though its energy absorption characteristics are relatively unique, making it a very desirable material. The principal reason why EPO has not found wider use as an absorptive material in vehicle interiors is that the material, while exhibiting excellent energy absorption characteristics, does not exhibit a wide variety of other useful physical properties. For example, although the compressive strength of EPP is relatively high, the tensile strength is quite low, due to its essentially cellular nature and the manner in which this cellular structure is prepared. Further, and again due to the cellular nature of the product and the manner by which it is prepared, the bending strength is relatively low, parts being bent over any appreciable radius commonly exhibiting fracture. Thus, the compressive strength characteristics and energy absorption characteristics have not been able to be taken advantage of in vehicle construction, which frequently requires considerable flexing during assembly, and which frequently requires components which will be subject to bending stress during use. This is unfortunate, as EPO is a relatively inexpensive material available in a wide variety of densities, which for most applications, would result in relatively light-weight parts.

It would be desirable to provide to the transportation and other industries, a method of employing EPO as a light-weight energy-absorptive material suitable for use in energy-absorptive vehicle interior parts, while being durable, i.e. being resistant to fracture encountered upon bending stress. It would further be desirable to utilize expandable polypropylene as a structural component which offers energy absorption capability, in such applications as automotive seating, headrests, armrests, side bolsters, vehicle pillars, dashboards, headliners, and the like.

SUMMARY OF THE INVENTION

It has been surprisingly discovered that encasing an EPO part within an integral skin polyurethane foam is capable of retaining the energy absorption and light-weight characteristics of EPO while yet providing parts which can be bent at angles of 90° or greater without displaying the brittle nature of EPO and without resulting in part breakage.

BRIEF DESCRIPTION OF THE DRAWINGS

FIG. 3b is a cross-section across B—B of FIG. 3a;

DESCRIPTION OF THE PREFERRED EMBODIMENTS

The subject invention pertains to articles of manufacture produced from expanded polyolefin having adhered to at least one surface thereof, a layer of integral skin polyurethane foam prepared by the in situ foaming of a foamable integral skin reactive mixture within a closed mold containing the EPO part. Preferably, and as shown in FIGS. 4a–4d, the integral skin foam layer is present on at least the surface of an EPO part which is designed to be bowed or flexed in such a manner that the integral skin polyurethane layer finds itself on the convex surface of the part or subject to tensile stress as a result of the bending or flexing.

By expanded polyolefin (EPO) is meant expanded polyethylene (EPE), expanded polypropylene (EPP), expanded polybutylene (EPB), and copolymers of ethylene, propylene, butylene, 1,3-butadiene, and other olefin monomers, particularly α-olefin monomers having from 5 to 18 carbon atoms, and/or cycloalkylene monomers such as cyclohexane, cyclopentene, cyclohexadiene, norbornene, and aromatic substituted olefins such as styrene, α-methylstyrene, paramethylstyrene, and the like. The most preferred EPO is expandable polypropylene (EPP) and its copolymers with ethylene and butylene. The particular polymer and/or copolymer is selected so as to provide the desired physical properties, such as tensile strength, compressive strength, modulus, density, molding temperature, softening point, etc. Expandable polyolefins are produced by a bead polymerization process in which relatively small uniform beads of polymer are produced, containing a gas which is later utilized to effect blowing during the molding process. The most commonly used gas is air, although other gases including low boiling liquids which produce gases at the molding temperatures may be used. Suitable, for example, are air, nitrogen, carbon dioxide, pentane, petroleum ether, methylethylketone, various halocarbons, and the like. For environmental concerns, it is obvious that the most preferred blowing agents are the permanent gases, i.e. air, nitrogen, carbon dioxide, and the like.

The processes for forming the expandable beads are by now well known, as illustrated by the following U.S. Pat. Nos.: 5,496,864; 5,468,781; 5,459,169; 5,071,883; 4,769,393; and 4,676,939, which are incorporated herein by reference. The most commonly used expanded polyolefins are homopolymers of propylene, i.e. polypropylene, or copolymers derived from a majority of propylene together with ethylene, butylene, or other monomers.

Figure 1:
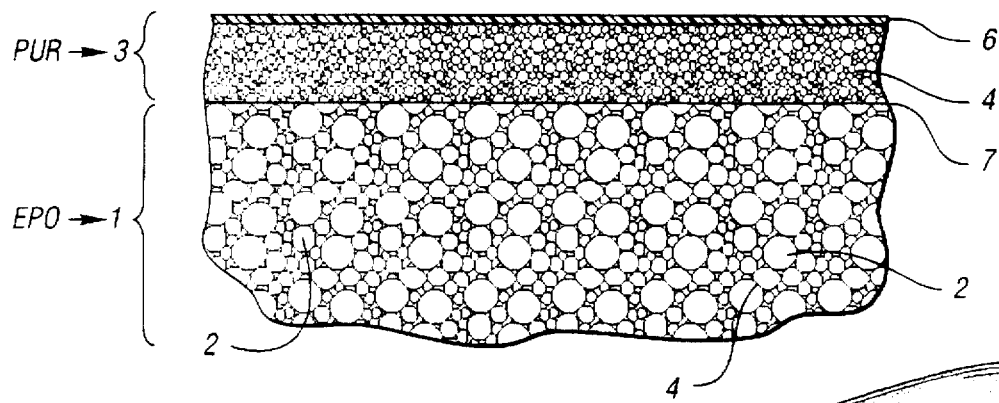
FIG. 1 illustrates a cut-away section through a portion of an integral skin polyurethane foam encased expanded polypropylene part.

While a variety of molding processes are suitable for preparing parts, a common molding procedure is to prepare a closed mold having porous walls. The walls, for example, may be composed of metal plates containing numerous pinholes, slots, or other orifices. In manual processes, the mold is filled with the required quantity of expandable polyolefin beads, the mold closed, and hot air and/or superheated steam applied through the porous mold surfaces to both heat and expand the expandable polyolefin particles such that they at least partially coalesce at the bead margins to form a foamed, unitary structure. A cross-section taken through such a structure will show the bead-derived nature of the product, as illustrated in FIG. 1. Many of the strength properties, i.e. tensile strength in particular, are linked to the degree of coalescence of the beads when fusing with one another, and the pressure present during the fusing process which facilitates thorough fusing. The density of the part may generally be adjusted by supplying more or fewer beads, i.e. a greater or lesser weight of expandable beads in the mold. Likewise, expandable polyolefin beads may be produced with a range of expansion properties depending upon their intended uses, i.e. containing more or less expansion-producing gas. For sheets of expanded polyolefin materials, a continuous double band press whose stainless steel belts contain pinholes, slots, or other devices, may be used to entrap beads, expand the beads, and cool the resulting expanded product prior to its continuous exit from the opposite end of the double band press. Such presses are commonly used for fiber reinforced polyolefin non-porous structural materials. Suppliers of expandable polyolefin beads, equipment for their molding, and molding technology include Japan Styrene Paper, BASF Corporation, and BASF Aktiengesell-schaft, among others.

Integral skin polyurethane flexible foams are by now well known to those skilled in the art. Such foams were originally introduced many years ago, and contained a fairly large amount of volatile CFC blowing agent, for example 18% or so by weight. When a foamable polyurethane mixture containing this relatively large amount of volatile blowing agent was introduced in a mold with a relatively cool surface, the interior pressure generated by the expanding polyurethane mixture coupled with the cooler walls of the molding tool prevented the blowing agent at the surface of the mold from volatilizing, or caused it to condense and to be resolubilized in the polyurethane ingredients. Thus, a part with a foamed interior, yet having a solid, essentially non-cellular polyurethane skin, was produced. As the skin is integral with the remainder of the component rather than being separately applied or formed in a subsequent operation, the unique foams were termed "integral skin foams." Both the foams and their formulations have developed a unique status in the broader field of polyurethanes.

The foregoing procedure is still utilized in making such vehicle components such as sun visors, steering wheels, armrests, and the like, in addition to many other components within the transportation and other industries. More recently, however, due to the Montreal protocol and other environmental concerns, use of CFCs and other volatile blowing agents, even those of the saturated lower boiling aliphatic hydrocarbons, is undesirable. Thus, considerable research has been conducted into providing compositions which are water blown and yet which provide an integral skin.

Water blown foams, unlike those blown with volatile blowing agents, generate their foamed structure by an entirely different mechanism. Rather than a volatile liquid volatilizing and forming what is essentially a bubble in a liquid, water is a reactive blowing agent which reacts with the isocyanate component of the polyurethane mixture producing carbon dioxide gas through chemical reaction. The carbon dioxide gas then serves as a blowing agent. As carbon dioxide is relatively uncondensable under the temperatures and pressures utilized in polyurethane molding, it is easily seen that the development of water blown integral skin polyurethane foams was accompanied by great skepticism. However, such foams are now commonplace, and their properties well known.

In general, the skin of water blown polyurethane foams is somewhat less thick than those produced by blowing with volatile blowing agents, although in many cases the abrasion resistance of the skin is somewhat higher. Raw materials for both volatile blowing agent blown and water blown integral skin foams are available from many manufacturers, for example, Dow Chemical, ARCO Chemical, BASF Corporation, Bayer, and the like. Reference may be had to the following U.S. Pat. Nos. which are herein incorporated by reference: 5,514,723; 5,389,693; 5,338,820; 5,284,880; 5,266,234; 5,236,961; 5,236,960; 5,216,035; 5,210,103; 5,166,183; 5,132,329; and 5,057,544.

As an example of the benefits of the subject invention, a mold in the shape of a car seat bucket may be produced from metal or from other materials, having perforated mold walls, and expandable polypropylene beads directed into the mold either by hand, or by an airstream, etc. Airstream delivery is common in continuous or semi-continuous molding processes. The mold is then closed and superheated steam or hot air used to expand and fuse the polypropylene beads into contact with the mold surfaces to produce the desired shape, for example a bucket shape suitable for a car seat. However, while the light weight and energy absorption characteristics of such a car seat bucket are very desirable, and while car seat bucket portions which are under compression will function well, other portions of the bucket, especially those near the edges, for example the side walls or extending bottom lip of the bucket will be subject to bending stress during use by the consumer, and will not be able to sustain any continued use without breaking. For example, these parts will crack almost immediately when bending stress of any appreciable magnitude is imposed upon them. Thus, while being simply moldable, while exhibiting sufficient compressive strength and energy absorption characteristics for many applications, and while desirably being very lightweight, such an expandable polypropylene shell is incapable of use by itself due to its brittle nature.

It has now been discovered that if an integral skin flexible polyurethane foam is molded around such an expanded polyolefin shell, the composite structure thus produced not only retains the compressive strength of the polyolefin, and its energy absorption characteristics, but moreover is relatively ductile, capable of being bent at angles greater than 90° without breaking. Thus, automotive seating components which could not take advantage of the energy absorption characteristics of EPO can now do so when the interior EPO component is surrounded by a relatively thin layer of integral skin polyurethane flexible foam.

Although the invention thus far has been described in relation to a seat component, it must be emphasized that many other interior automotive parts and other parts in vehicles, buildings, and the like, can benefit from the unusual properties of the structural composites produced by the subject invention. For example, vehicular dashboards frequently have an extending and relatively thin overhang above the instrument panel cluster. If this dashboard component were made of EPP, and a load suddenly thrust upon the EPP overhang, a brittle fracture would likely result, resulting in aesthetic damage which would be difficult and expensive to repair. By utilizing a dashboard component which in the main consists of expandable polyolefin, surrounded by a relatively thin layer of integral skin polyurethane foam, the overhanging lip may be bent to appreciable angles and absorb appreciable bending force without exhibiting any sign of fracture. Moreover, the thickness of the integral skin polyurethane flexible foam layer may be adjusted to that of a very thin or even non-existent section where an EPP part is not likely to exhibit fracture due to bending stress, and a thicker layer where such bending stress and fracture are more likely to be encountered. Thus, the weight saving low density attributes of EPO can be taken advantage of.

Many other interior automotive parts can also benefit from the subject invention. An example is an upholstered door pillar insert which is designed to absorb energy in addition to performing an aesthetic function. If such a pillar panel were constructed only of EPO covered with an upholstered layer, the bending of such a component during automotive assembly may cause the part to crack during the bending operation. By covering at least the exterior convex surface with an integral skin polyurethane flexible foam, the part may be bent to greater than a 90° angle without exhibiting any fracture, thus facilitating assembly of this and other interior panels into the vehicular structure.

In the process of the invention, a composite part is prepared having an interior EPO structure, surrounded by an integral skin polyurethane foam prepared in situ on at least one surface of the EPP part, and sufficient in thickness such that the EPP part may be subject to bending stress without breakage. For example, in the case of the seat previously mentioned, a suitable mold is prepared, if necessary containing metal or polymer inserts for appropriate hardware attachment points, the mold filled with an appropriate amount of expandable polyolefin beads, and foamed using traditional processing. Alternatively, the EPO part may be prepared following which metal or polymer attachment-facilitating parts may be adhered or otherwise attached as necessary. Following preparation of the EPO portion of the finished structural component, it is placed in a mold by traditional mold locating equipment, for example, pins, bearing surfaces, and the like, such that a space is created between a mold wall and the interior EPO part. An expandable integral skin polyurethane flexible foam reactive mixture is then injected into the closed mold and allowed to foam in situ around all or at least one surface of the EPO interior portion of the composite structure. Following the foaming operation, the composite part is demolded, and now consists of a polyolefin inner structure surrounded by an integral skin polyurethane flexible foam. In the case of the seat bucket previously described, for example, a polyurethane integral skin flexible foam thickness of about 6 millimeters has been found to work exceptionally well. Integral skin foam density may suitably range from about 0.2 g/cm$^3$ to about 0.7 g/cm$^3$, preferably about 0.3 g/cm$^3$ to 0.6 g/cm$^3$. Both higher and lower densities are useful as well.

Clearly, the thickness of the surrounding polyurethane integral skin flexible foam must be tailored to the application. If this layer is too thick, the relatively dense polyurethane flexible foam will detract from the strength-to-weight ratio of the part, resulting in a weight penalty. Such weight penalty is very inappropriate in today's transportation market where light-weight and associated low fuel consumption are desirable objectives. On the other hand, if the layer of integral skin polyurethane foam is made too thin, it will found that the structure thus produced is not resistant to bending stress to the extent required for a commercially useful structure.

In practice, the thickness of the integral skin polyurethane portion of the composite part must be adjusted to provide the requisite amount of resistance to breakage under bending stress, coupled with the least amount of polyurethane material. At the same time, the external flexible integral skin polyurethane foam also serves a cushioning and comfort producing function which is generally not possible with expanded polyolefin foams, as the latter, though being energy-absorptive, are relatively hard and thus not generally thought as "comfortable" surfaces. For EPO parts which have thick cross-sections, which will not be subject to a great deal of bending because of their intrinsic strength, the integral skin polyurethane foam layer may be less. Moreover, as explained previously, many parts will have thin sections which are subject to bending stress, while other portions of the same structure will be of such thickness, contoured in such a way, or located in such a manner so as not to be subject to bending stress. These sections need not contain any appreciable amount of polyurethane flexible foam on their exterior.

By the term "subject to breakage under bending stress" is meant that a part which, if constructed of EPO, would be subject to breakage under conditions which might be expected under normal or anticipated abnormal usage. By EPO part in this context, is meant the EPO part without any aesthetic fabric, leather, or other trim covering. By the term "effective breakage reducing amount" pertaining to the integral skin polyurethane flexible foam layer introduced onto the EPO part, is meant an amount which will reduce the breakage of the part under the aforesaid conditions to an acceptable value, preferably totally reducing breakage. This amount can generally be assessed in the laboratory or at a relevant production facility by simply bending the composite part to a degree greater than that of the maximum expected during use. This bending operation may be conducted several times. If no breakage is observed under these conditions, then the amount of polyurethane is sufficient to effectively reduce breakage. If, however, breakage does occur after one or a series of bending operations, then the amount of polyurethane should generally be increased, unless the amount of breakage is within acceptable commercial tolerances. As indicated previously, the thickness of the polyurethane layer which will produce the desired decrease in breakage of the EPO composite part as compared to an EPO part alone will vary depending upon the dimensions of the part, its thickness, the particular EPO polymer or copolymer, the molding process, and the like. However, in general, a thickness layer of about 3 millimeters to about 2 centimeters, more preferably from about 3 millimeters to about 1.2 centimeters, and most preferably in the range of 4 millimeters to 8 millimeters has been found to be sufficient.

The invention may be further described with reference to the drawings, which are to be viewed as exemplary only, and not limiting. The scope of the invention is defined by the claims. In FIG. 1 is shown a drawing of a cross-section taken across a composite of the subject invention. At 1 is the expanded polyolefin portion of the structure, composed of numerous rather large expanded beads 2, in this case of expanded polypropylene, which are at least partially fused at their boundaries 4 to form a unitary whole. Integral with the EPO structure 1 is a superficial layer 3 of a polyurethane integral skin flexible foam. The integral skin foam contains an interior foam portion 4 containing numerous small cells (bubbles) 5, and an integral skin 6. No special adhesive or adhesion-promoting substance is required at the interface 7 between the EPO and the PUR, although an adhesive coating can be used if desired, for example a tacky, partially cured non-cellular polyurethane adhesive, a silane adhesion promoter, e.g. γ-aminopropyltrimethoxysilane, or the like.

Figure 2:
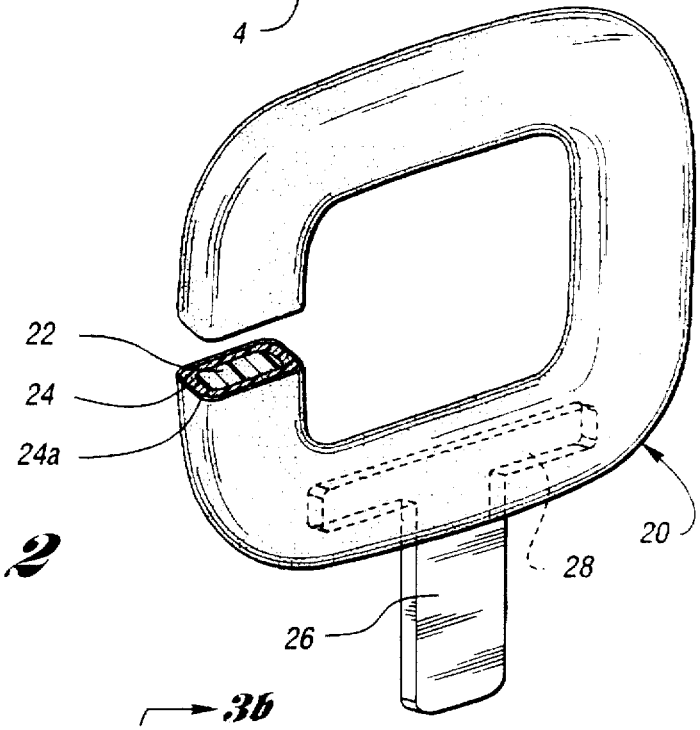
FIG. 2 illustrates a headrest constructed of expanded polypropylene encased with an integral skin polyurethane foam.

FIG. 2 illustrates a headrest prepared in accordance with the subject invention. The headrest 20 consists of an inner core of EPO 22 molded around the mold insert portion 28 of sliding metal support bracket 26 which is adapted in shape to slide up or down in an automotive seat back so as to adjust the height of the headrest to the height of the occupant. In the cut-away section, surrounding the EPP core 22 is a foamed polyurethane surround 24 with integral skin 24a.

Figure 3A:
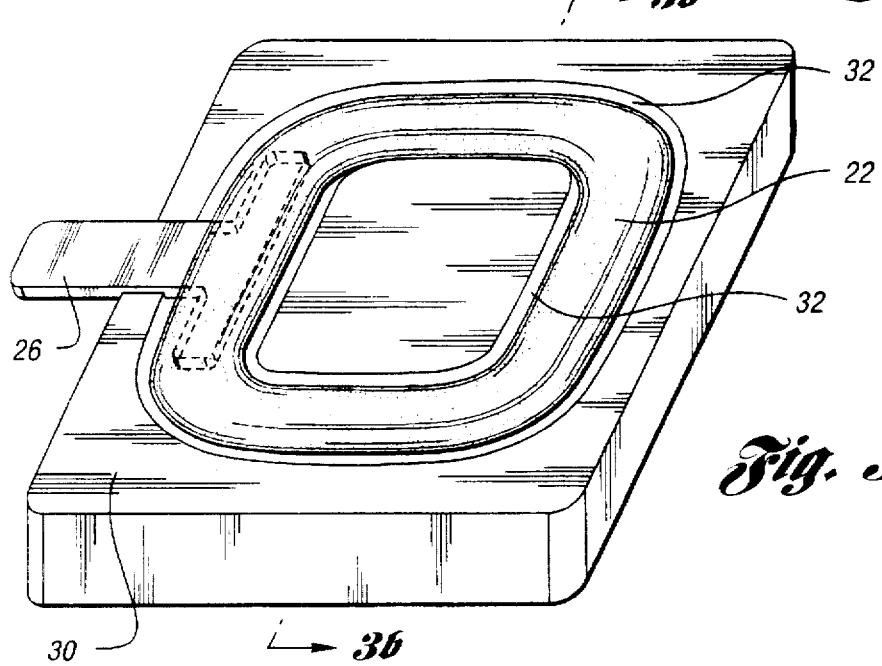
FIG. 3a illustrates the headrest of FIG. 2 in position in the lower half of a mold prior to encasing with integral skin polyurethane foam.
Figure 3B:
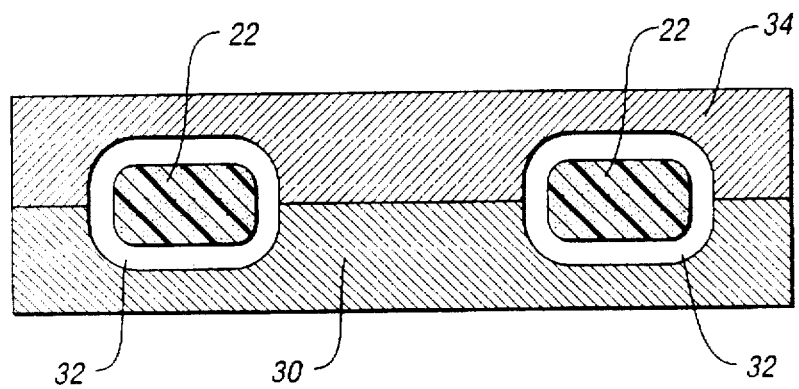

In FIGS. 3a and 3b are shown a final stage of preparation of the headrest of FIG. 2. The EPP core 22 with metal support bracket 26 is placed within lower mold half 30 such that the inner core is surrounded by clearances 32 between core 22 and mold 30. A section across 3b–3b of FIG. 3a is shown in FIG. 3b, which also shows the top half of the mold 34. Upon injection of a reactive integral skin polyurethane flexible foam formulation into cavity 32, the mixture foams and cures forming a skin adjacent the mold surface. The mold halves are then parted and the part of FIG. 2 removed.

Figures 4A, 4B:
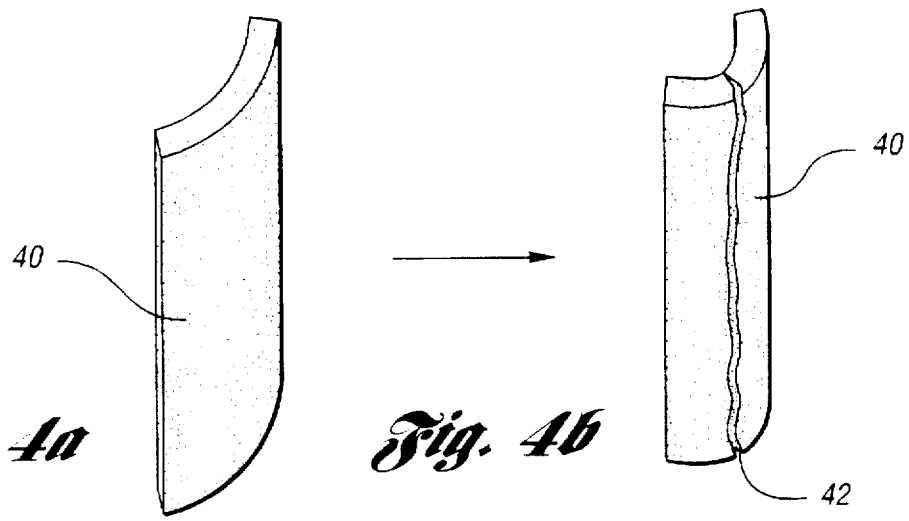
FIG. 4a illustrates an expanded polyolefin vehicle interior part not of the subject invention, prior to flexing.
FIG. 4b illustrates the cracking of the expanded polyolefin part of FIG. 4a as it is flexed, as might be required during vehicle assembly.

FIGS. 4a–4d illustrate the benefits of the subject invention in a simple application such as a door pillar trim unit which must be flexed about its longitudinal axis during installation to be inserted between retaining structures. Cloth trim which would normally cover these structures has been omitted for clarity. FIG. 4a illustrates a trim part 40 of all EPP, manufactured as a cylindrical section of modest curvature. Upon flexing about the longitudinal axis for installation into the vehicle interior, as shown in FIG. 4b, the part 40 cracks under the bending stress, forming longitudinal fissure 42. The part will have to be scrapped and replaced.

Figures 4C, 4D:
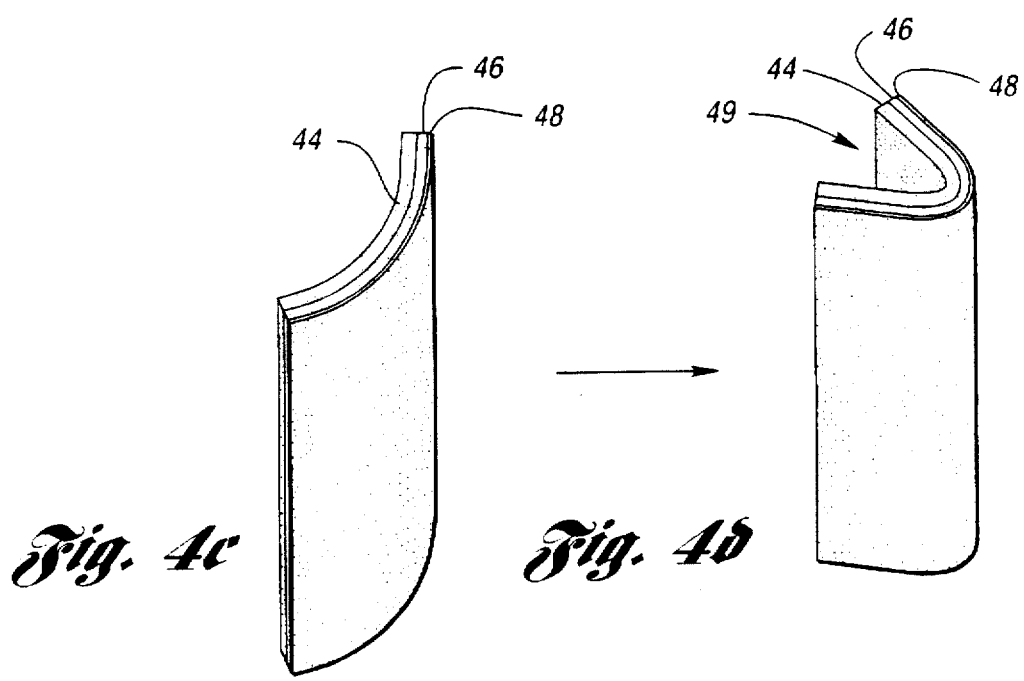
FIG. 4c illustrates an expanded polyolefin part encased on one side with integral skin polyurethane foam in accordance with the subject invention.
FIG. 4d illustrates that the structural composite part of FIG. 4c may be bent to highly acute angles without fracture.

In FIG. 4c is shown a part produced in accordance with the subject invention. On the convex side of the EPP core 44 is molded an integral skin polyurethane foam with foamed interior 46 and integral skin 48. The integral skin polyurethane flexible foam may be 2–4 mm thick. As illustrated in FIG. 4d, the trim part may be bent around its longitudinal axis to a quite acute angle 49 without exhibiting fracture, i.e. the fissure shown in FIG. 4b.

Having generally described this invention, a further understanding can be obtained by reference to certain specific examples which are provided herein for purposes of illustration only and are not intended to be limiting unless otherwise specified.

EXAMPLE 1

A seat back is prepared by first forming a non-load bearing structure to be mounted onto a metal (spine constructed) frame. The structure is prepared by heating expandable polypropylene beads in a closed mold with steam. After the part has cooled, it is inserted into a seat back mold of larger dimensions and held away from the mold walls by conventional standoffs, the distance between the EPP inner structure and the mold being maintained at about 6–13 mm. The mold is closed, and a water blown integral skin polyurethane reactive formulation injected into the empty space surrounding the expanded polypropylene inner structure. The foam rises and cures, encapsulating the expanded polyolefin inner structure, and forming an integral skin having the texture of the mold surface. The part is then removed from the tool and the process repeated.

Having now fully described the invention, it will be apparent to one of ordinary skill in the art that many changes and modifications can be made thereto without departing from the spirit or scope of the invention as set forth herein.

What is claimed is:

1. An energy management structural composite resistant to breakage under bending stress, comprising in major part an expanded polyolefin molded part surrounded on at least one surface by an effective breakage minimizing layer of an in situ-produced integral skin polyurethane flexible foam, said integral skin polyurethane foam directly abutting said expanded polyolefin molded part.

2. The composite of claim 1 wherein said layer of integral skin polyurethane foam has a thickness of from about 2 mm to about 2 cm.

3. The composite of claim 1 wherein said expanded polyolefin molded part comprises a bucket for a vehicular seat.

4. The composite of claim 1 wherein said structural composite comprises an interior vehicular component selected from the group consisting of side bolsters, dashboards, headrests, armrests, pillars, and center consoles.

5. The composite of claim 1 wherein said expanded polyolefin comprises expanded polypropylene or expanded polypropylene copolymer.

6. The composite of claim 1 wherein said integral skin polyurethane foam comprises an aliphatic hydrocarbon blown or water blown integral skin polyurethane foam having an average density of from about 0.2 g/cm³ to about 0.7 g/cm³.

7. A process for the manufacture of an energy management structural composite resistant to breakage under bending stress, said process comprising:

b) positioning an expanded polyolefin part into a mold spaced apart from at least one surface thereof;

c) introducing a reactive, foamable integral skin polyurethane flexible foam formulation into said mold and allowing said formulation to foam and cure to form a structural composite having said integral skin foam surrounding at least one surface of said expanded polyolefin part; and d) removing said structural composite from said mold.

8. The process of claim 7, further comprising:

a) inserting a trim material adjacent said mold surface, wherein a trim-covered structural composite is removed from said mold in step d).

9. The process of claim 8 wherein said trim material is coated on a surface of said trim material closest said expanded polyolefin part with a polyurethane to trim adhesion promoter.

10. The process of claim 7 wherein said expanded polyolefin part further comprises attachment facilitating devices constructed of non-foam polymer or of metal.

11. The process of claim 10 wherein said attachment facilitating devices are introduced into a mold prior to molding said expanded polyolefin part in said mold.

12. A process for decreasing the weight of an energy management interior part of a transportation vehicle while maintaining an acceptable degree of resistance-to-breakage under bending stress, said process comprising:

constructing the major volumetric portion of said part from expanded polyolefin to form an expanded polyolefin interior;

surrounding said expanded polyolefin interior with an integral skin polyurethane flexible foam integument, wherein a light weight breakage-resistant structural composite part results.

13. The process of claim 12 wherein said structural composite part has a weight which is less by at least 20 percent based on the weight of a similarly sized component prepared entirely from integral skin polyurethane flexible foam.

14. The process of claim 12 wherein said structural composite part has a weight which is less by at least 40 percent based on the weight of a similarly sized component prepared entirely from integral skin polyurethane flexible foam.

* * * * *